US011288665B2

(12) United States Patent
Mitra et al.

(10) Patent No.: US 11,288,665 B2
(45) Date of Patent: Mar. 29, 2022

(54) TAAS FOR DELAY TOLERANT BLOCKCHAIN NETWORKS

(71) Applicant: Ford Global Technologies, LLC, Dearborn, MI (US)

(72) Inventors: Pramita Mitra, West Bloomfield, MI (US); Yifan Chen, Ann Arbor, MI (US); Abhishek Sharma, Ann Arbor, MI (US); Eric H. Wingfield, Ann Arbor, MI (US); James Fishelson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 16/549,330

(22) Filed: Aug. 23, 2019

(65) Prior Publication Data
US 2021/0056544 A1 Feb. 25, 2021

(51) Int. Cl.
*G06Q 20/38* (2012.01)
*G06F 16/27* (2019.01)
*G06F 16/23* (2019.01)
*H04L 69/16* (2022.01)
*G06Q 30/02* (2012.01)

(52) U.S. Cl.
CPC ....... *G06Q 20/389* (2013.01); *G06F 16/2379* (2019.01); *G06F 16/27* (2019.01); *G06Q 30/0215* (2013.01); *H04L 69/16* (2013.01)

(58) Field of Classification Search
CPC .. G06Q 20/389; G06Q 30/0215; G06F 16/27; G06F 16/2379; H04L 69/16
USPC ......................................................... 705/44
See application file for complete search history.

(56) References Cited

U.S. PATENT DOCUMENTS

| 8,532,565 | B2 | 9/2013 | Reeves et al. |
| 9,569,771 | B2 | 2/2017 | Lesavich et al. |
| 2010/0103851 | A1 | 4/2010 | Chintada et al. |
| 2012/0307725 | A1 | 12/2012 | Yamada et al. |
| 2018/0006937 | A1 | 1/2018 | Liu et al. |
| 2019/0014114 | A1 | 1/2019 | Beddus et al. |
| 2020/0167337 | A1* | 5/2020 | Kurian .................. G06Q 10/08 |

OTHER PUBLICATIONS

OASIS, MQTT Version 3.1.1, OASIS Standard, Oct. 29, 2014 (Year: 2014).*
"A Delay Tolerant Payment Scheme Based on the Etherium Blockchain," by Hu, Yining; Manzoor, Ahsan; Ekparinya, Parinya; Liyanage, Madhusanka; Thilakarathna; Jourjon, Guillaurme; Seneviratne, Aruna; Ylianttila, Mika E. Arxiv.org. Published: Jan. 30, 2018. (Year: 2018).*

* cited by examiner

*Primary Examiner* — Sara C Hamilton
(74) *Attorney, Agent, or Firm* — Brandon Hicks; Bejin Bieneman PLC

(57) ABSTRACT

A blockchain block generated by one or more blockchain nodes when the one or more blockchain nodes are only connected to a local area network is received, and the blockchain block is synchronized with a blockchain. After determining that a backhaul network device is not connected to the one or more blockchain nodes and then determining that the backhaul network device is connected to the one or more blockchain nodes, the blockchain is transmitted to the one or more blockchain nodes via the backhaul network device upon determining that the backhaul network device is connected to the one or more blockchain nodes.

20 Claims, 8 Drawing Sheets

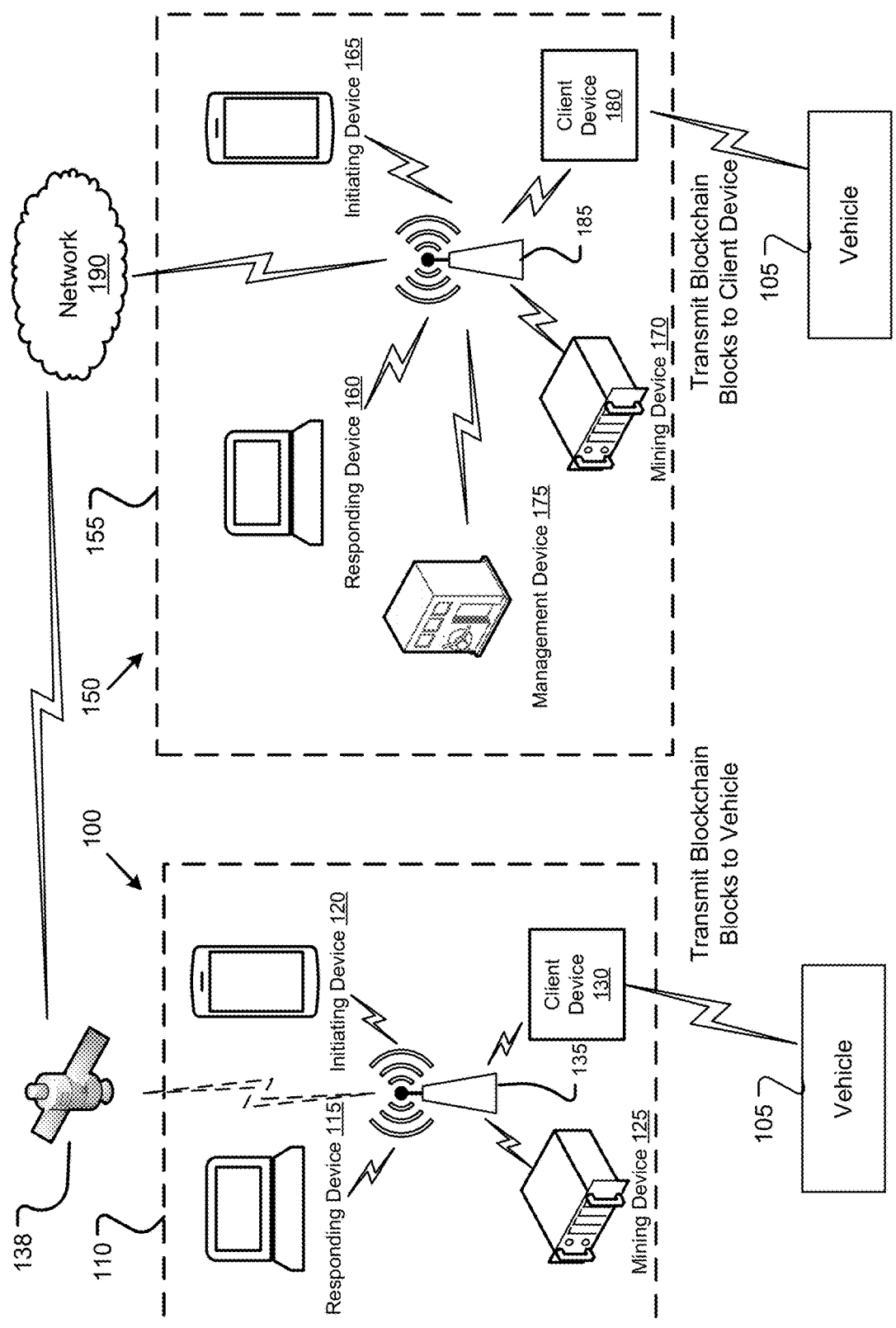

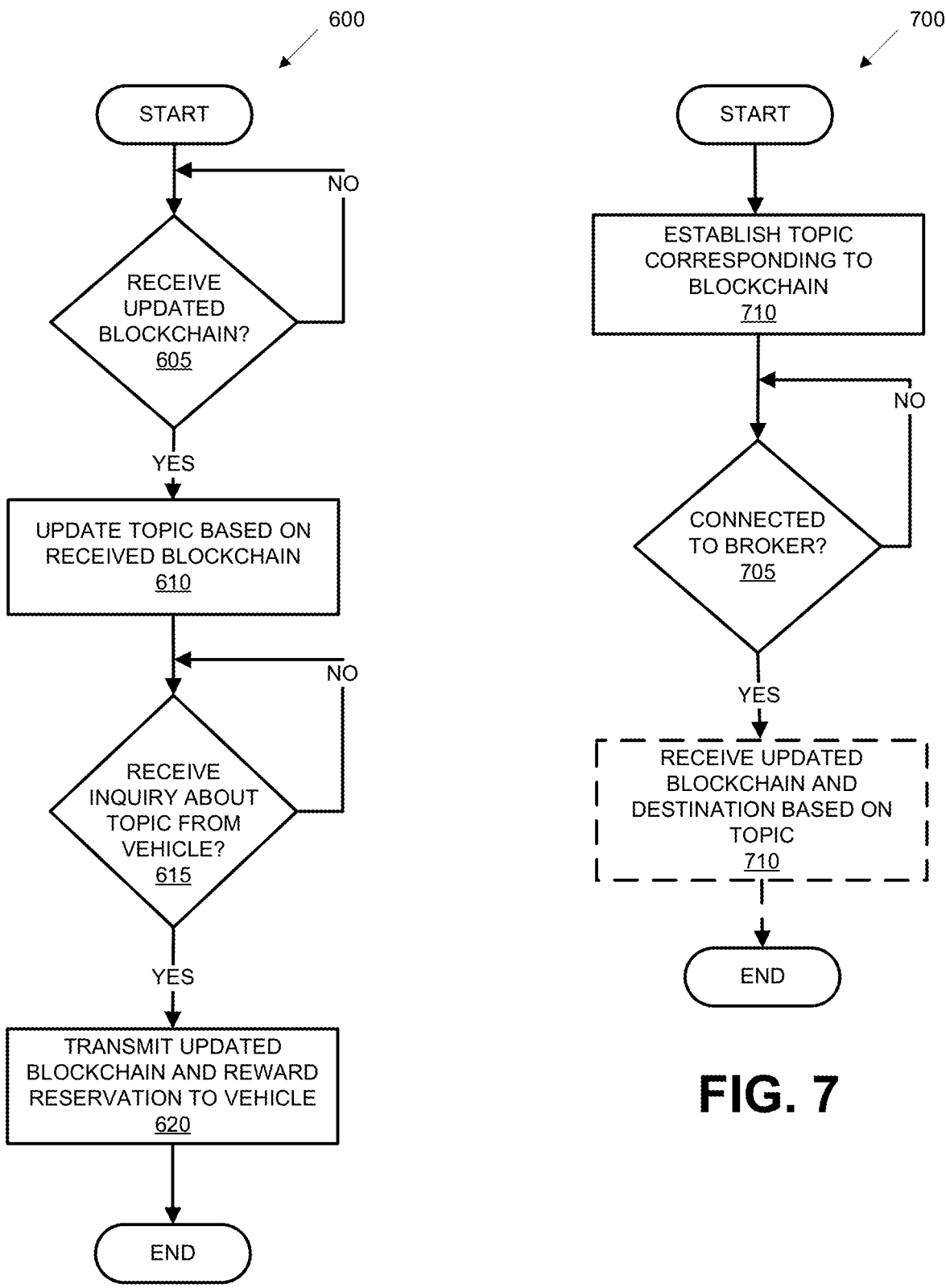

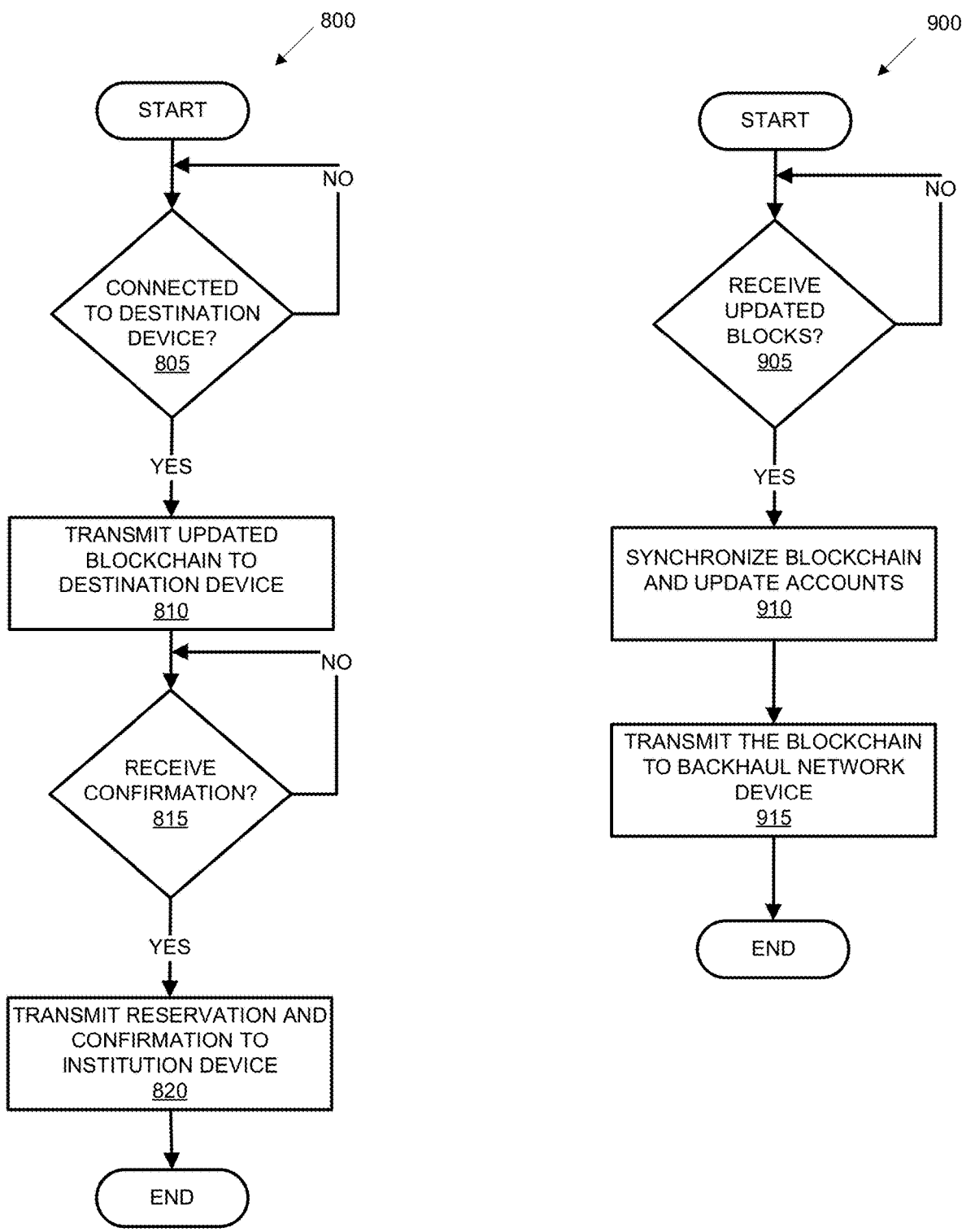

US 11,288,665 B2

TAAS FOR DELAY TOLERANT BLOCKCHAIN NETWORKS

BACKGROUND

A blockchain includes multiple blockchain blocks that are linked using suitable cryptography functions. Each blockchain block includes batches of validated records, and the validated records are hashed. Subsequently generated blockchain blocks include the hash of the previous blockchain block for linking purposes.

BRIEF DESCRIPTION OF THE DRAWINGS

FIGS. 1A and 1B are diagrams of an example system for using vehicles as nodes within a delay tolerant blockchain network.

FIG. 6 is a flow diagram illustrating an example process for transmitting one or more blockchain blocks to a vehicle.

FIG. 7 is a flow diagram illustrating an example process for receiving one or more blockchain blocks at a vehicle.

FIG. 8 is a flow diagram illustrating an example process for transmitting one or more blockchain blocks to one or more client devices from a vehicle.

FIG. 9 is a flow diagram illustrating an example process for synchronizing a blockchain with one or more blockchain blocks generated by one or more blockchain nodes during an intermittently-connected time period.

DETAILED DESCRIPTION

Figure 2A:
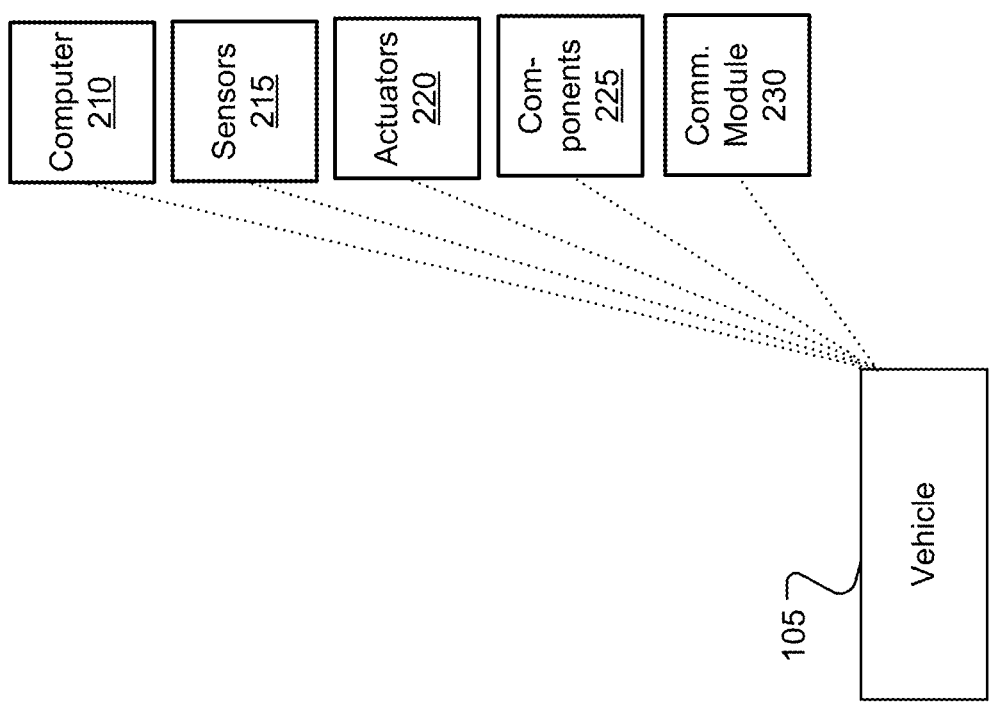
FIGS. 2A through 2G are diagrams of example devices disposed within the system illustrated in FIGS. 1A and 1B.
Figure 2B:
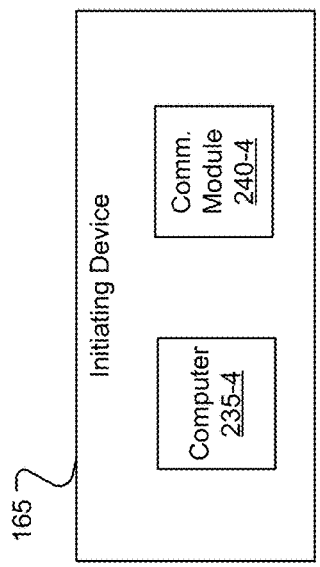
Figure 2C:
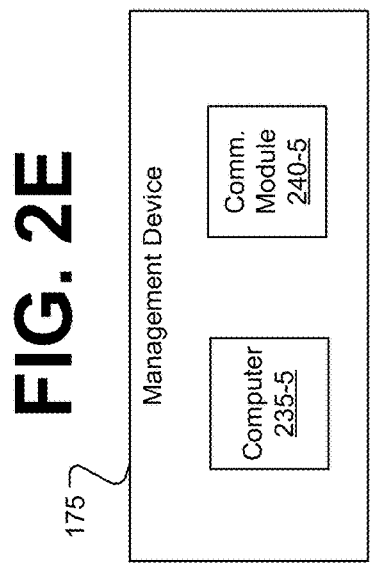
Figure 2D:
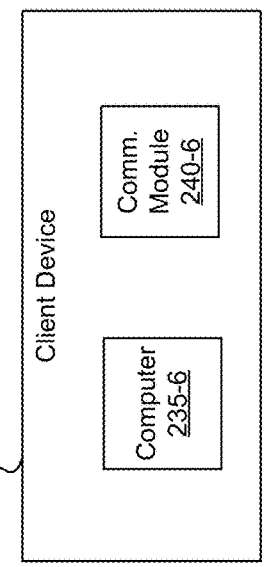
Figure 2E:
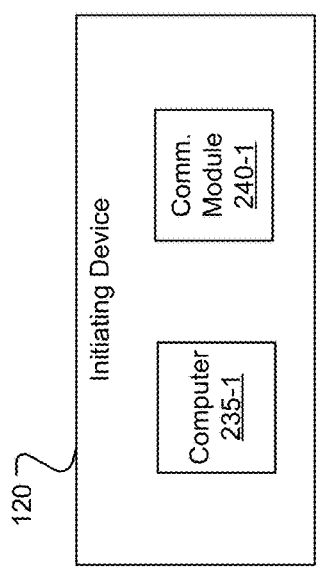
Figure 2F:
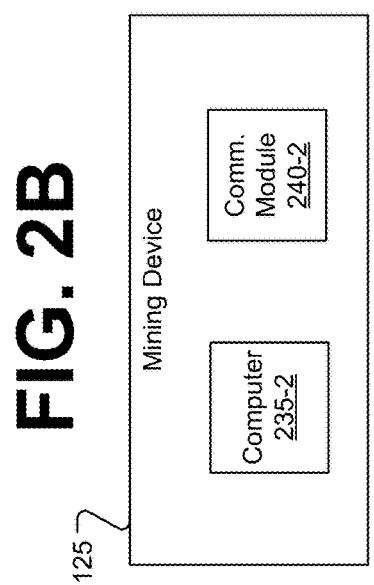
Figure 2G:
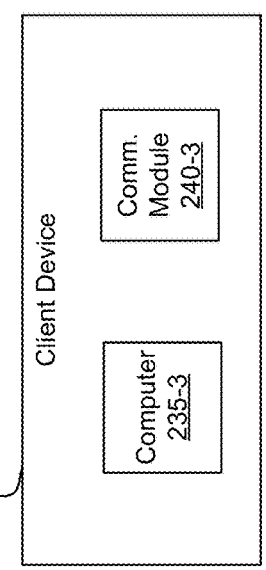

A system comprises a computer including a processor and a memory. The memory storing instructions executable by the processor to receive, from a vehicle computer, a blockchain block generated by one or more blockchain nodes when the one or more blockchain nodes are only connected to a local area network and synchronize the blockchain block with a blockchain. The processor is further programmed to, after determining that a backhaul network device is not connected to the one or more blockchain nodes and then determining that the backhaul network device is connected to the one or more blockchain nodes, transmit the blockchain to the one or more blockchain nodes via the backhaul network device upon determining that the backhaul network device is connected to the one or more blockchain nodes.

In other features, the processor is further programmed to transmit a delivery confirmation to the vehicle computer.

In other features, the processor is further programmed to receive the delivery confirmation and a reward reservation from the vehicle computer and generate, after receiving the delivery confirmation and the reward reservation, a transaction to allocate tokens to a digital account associated with the vehicle computer.

In other features, the backhaul network device comprises a satellite.

In other features, a vehicle includes the vehicle computer.

In other features, the vehicle comprises at least one of a land vehicle or an aerial vehicle.

In other features, the vehicle computer is configured to transmit the blockchain block via a Message Queuing Telemetry Transport (MQTT) communication protocol.

In other features, the vehicle computer is configured to receive the blockchain block from a roadside device disposed proximate to an intermittently-connected communication environment.

In other features, the roadside device is configured to associate a topic with the blockchain block based on the MQTT communication protocol.

In other features, the roadside device is configured to transmit the blockchain block to the vehicle upon receiving a topic inquiry from the vehicle.

A method comprises receiving, from a vehicle computer, a blockchain block generated by one or more blockchain nodes when the one or more blockchain nodes are only connected to a local area network and synchronizing the blockchain block with a blockchain. The method also comprises after determining that a backhaul network device is not connected to the one or more blockchain nodes and then determining that the backhaul network device is connected to the one or more blockchain nodes, transmitting the blockchain to the one or more blockchain nodes via the backhaul network device upon determining that the backhaul network device is connected to the one or more blockchain nodes.

In other features, the method includes transmitting a delivery confirmation to the vehicle computer.

In other features, the method includes receiving the delivery confirmation and a reward reservation from the vehicle computer and generating, after receiving the delivery confirmation and the reward reservation, a transaction to allocate tokens to a digital account associated with the vehicle computer.

In other features, the backhaul network device comprises a satellite.

In other features, a vehicle includes the vehicle computer.

In other features, the vehicle comprises at least one of a land vehicle or an aerial vehicle.

In other features, the vehicle computer is configured to transmit the blockchain block via a Message Queuing Telemetry Transport (MQTT) communication protocol.

In other features, the vehicle computer is configured to receive the blockchain block from a roadside device disposed proximate to an intermittently-connected communication environment.

A system comprises a vehicle including a vehicle system. The vehicle system includes a vehicle computer including a processor and a memory, and the memory including instructions such that the processor is programmed to receive, from a client device, a blockchain block generated by one or more blockchain nodes when the one or more blockchain nodes are only connected to a local area network and a reward reservation. The system also includes a management device including a computer including a processor and a memory, and the memory includes instructions such that the processor is programmed to: receive the blockchain block and the reward reservation; synchronize the blockchain block with a blockchain; update a digital account associated with the vehicle based on the reward reservation; and after determining that a backhaul network device is not connected to the one or more blockchain nodes and then determining that the backhaul network device is connected to the one or more blockchain nodes, transmit the blockchain to the one or more blockchain nodes via the backhaul network device upon determining that the backhaul network device is connected to the one or more blockchain nodes.

In other features, the reward reservation comprises a preset token allocation.

Computers within rural areas may face many challenges related to continuous Internet communication, such as a lack of suitable infrastructure. For example, computers within communication connectivity-restricted environments may not be able to provide services that require continuous network connectivity. Transportation-as-a-Service (TaaS), or Mobility-as-a-Service (MaaS), involves providing transportation solutions to consumers as a service. As disclosed herein, it is possible for vehicles to transport one or more blockchain blocks between an environment that is only intermittently connected to the Internet and an environment that is continuously connected to the Internet. For example, by using TaaS services, vehicles can be used to transport one or more blockchain blocks to an institution for reconciliation, e.g., synchronization, purposes.

In the present context, the one or more blockchain blocks could be generated by one or more blockchain nodes that were not connected to the Internet during generation of the blockchain blocks. As such, by using vehicles to deliver the blockchain blocks to an management device, the risk of double-spending is mitigated since the blockchain blocks can be reconciled with the blockchain connected to the Internet in a relatively quicker manner.

A blockchain is a distributed electronic ledger. Each blockchain node stores, i.e., in a memory, a copy of the blockchain. The blockchain nodes may, for example, receive data blocks from one or more computers and may upload the data blocks to the blockchain, i.e., store the respective data blocks in respective storage locations in the blockchain such that each data block is linked to one respective previous data block. Each blockchain node can compare its stored blockchain data, i.e., linked data blocks, to blockchains stored by other blockchain nodes to verify the data blocks. For example, each blockchain node can generate a hash based on the data stored in a respective data block of a blockchain stored by another blockchain node. In the case the hash generated by the one blockchain node matches the hash stored by the other blockchain node for the respective data block, the one blockchain node determines the data block is verified.

The blockchain stores data based on generation of hashes for blocks of data. A hash in the present context is a one-way encryption of data having a fixed number of bits. An example of hash encryption is SHA-256. The hashes provide links to blocks of data by identifying locations of the block of data in storage (digital memory), for example by use of an association table mapping the hashes of the storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key.

As used herein, blockchain "mining" or simply "mining" refers to a process of validating a block of on-line transactions by a mining device, e.g., mining node, or "miner." The mining device can validate a block for inclusion in a blockchain by solving a problem or puzzle. Validating the block may qualify the mining device for a reward and/or appropriate fee. In various implementations, the reward and/or the fee comprise digital assets, or "tokens." The terms "mining device" and "miner" may be used interchangeably and refer to a network node capable of solving a problem or puzzle via one or more cryptographic hashing operations, such as using a proof-of-work-type process or approach.

As used herein, a "responding device" refers to a computing device associated with a vendor or seller, and an "initiating device" may refer to a computing device associated with a vendee or purchaser. For example, the vendee may use the "initiating device" to initialize and/or finalize a transaction with the "responding device" within a blockchain environment. As used herein, a "management device" refers to a computing device associated with an institution that deploys the blockchain. For example, the institution may be a financial institution, a government institution, a healthcare institution, or the like.

FIG. 1A is a block diagram of an example system 100 that includes a vehicle 105 proximate to an intermittently-connected communication environment 110. As shown, the intermittently-connected communication environment 110 can include a responding device 115, a initiating device 120, at least one mining device 125, a client device 130, and a base station 135. The base station 135 can function as a hub for a local wireless network between the responding device 115, the initiating device 120, the mining device 125, and the client device 130. Additionally, the base station 135 can establish an intermittent wireless connection with a backhaul network device, such as a satellite 138, during one or more time periods such that the devices within the intermittently-connected communication environment 110 are connected to a wide area network.

FIG. 1B is block diagram of an example system 150 that includes the vehicle 105 proximate to a wide area communication environment 155. As shown, the communication environment 150 can include a responding device 160, an initiating device 165, at least one mining device 170, an management device 175, a client device 180, and a base station 185. The base station 185 can function as a hub for a local wireless network between the responding device 160, the initiating device 165, the mining device 170, the banking device 175, and the client device 180. Additionally, the base station 185 can establish wireless or wired connection with a network 190. In one or more implementations, the client devices 130, 180 may be roadside devices or the like. The network 190 is also in communication with the backhaul network device.

The devices 115, 120, 130, 160, 165, 175 can comprise blockchain nodes of a blockchain. The network may support a plurality of blockchain nodes as shown in FIGS. 1A and 1B. The devices 115, 120, 130, 160, 165, 175 can be programmed to provide operations such as disclosed herein. While FIGS. 1A and 1B illustrate a single mining device 125, 170, it is understood that the respective environments 110, 155 include multiple mining devices. In an example implementation, the institution that deploys and/or manages the blockchain may select and/or provide the mining devices 125, 175 used within the respectively environments 110, 155. Depending on the architecture of the blockchain, the blockchain nodes may be full nodes or light nodes. Additionally or alternatively, each blockchain node may provide mining functionality within the respective environments 110 and 155. Full nodes refer to blockchain nodes that can verify transactions within the blockchain, and light nodes refer to blockchain nodes that only download the block headers of the blockchain blocks to validate the transactions.

The network 190 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

FIG. 2A is a block diagram of an example vehicle control system 200. The system 200 includes a vehicle 105, which can be a land vehicle such as a car, truck, etc., or an aerial vehicle such as a drone. The vehicle 105 includes a computer 210, vehicle sensors 215, actuators 220 to actuate various vehicle components 225, and a vehicle communications module 230. Via a network, the communications module 230 allows the computer 210 to communicate with the client devices 135, 180. In an example implementation, the client devices 135, 180 may communicate with the computer 210 via a Message Queuing Telemetry Transport (MQTT) communication protocol or any other suitable communication protocol.

The computer 210 includes a processor and a memory. The memory includes one or more forms of computer-readable media, and stores instructions executable by the computer 210 for performing various operations, including as disclosed herein.

The computer 210 may operate a vehicle 105 in an autonomous, a semi-autonomous mode, or a non-autonomous (manual) mode. For purposes of this disclosure, an autonomous mode is defined as one in which each of vehicle 105 propulsion, braking (e.g., stopping), and steering are controlled by the computer 210; in a semi-autonomous mode the computer 210 controls one or two of vehicles 105 propulsion, braking, and steering; in a non-autonomous mode a human operator controls each of vehicle 105 propulsion, braking, and steering.

The computer 210 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 210, as opposed to a human operator, is to control such operations. Additionally, the computer 210 may be programmed to determine whether and when a human operator is to control such operations.

The computer 210 may include or be communicatively coupled to, e.g., via the vehicle 105 communications module 230 as described further below, more than one processor, e.g., included in electronic controller units (ECUs) or the like included in the vehicle 105 for monitoring and/or controlling various vehicle components 225, e.g., a powertrain controller, a brake controller, a steering controller, etc. Further, the computer 210 may communicate, via the vehicle 105 communications module 230, with a navigation system that uses the Global Position System (GPS). As an example, the computer 210 may request and receive location data of the vehicle 105. The location data may be in a known form, e.g., geo-coordinates (latitudinal and longitudinal coordinates).

The computer 210 is generally arranged for communications on the vehicle 105 communications module 230 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 210 may transmit messages to various devices in the vehicle 105 and/or receive messages from the various devices, e.g., vehicle sensors 215, actuators 220, vehicle components 225, a human machine interface (HMI), etc. Alternatively or additionally, in cases where the computer 210 actually comprises a plurality of devices, the vehicle 105 communications network may be used for communications between devices represented as the computer 210 in this disclosure. Further, as mentioned below, various controllers and/or vehicle sensors 215 may provide data to the computer 210.

Vehicle sensors 215 may include a variety of devices such as are known to provide data to the computer 210. For example, the vehicle sensors 215 may include Light Detection and Ranging (lidar) sensor(s) 115, etc., e.g., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 215, e.g., fixed to vehicle 105 bumpers may provide data to provide and range velocity of objects (possibly including second vehicles 106), etc., relative to the location of the vehicle 105. The vehicle sensors 215 may further include camera sensor(s) 215, e.g. front view, side view, rear view, etc., providing images from a field of view inside and/or outside the vehicle 105.

The vehicle 105 actuators 220 are implemented via circuits, chips, motors, or other electronic and or mechanical components that can actuate various vehicle subsystems in accordance with appropriate control signals as is known. The actuators 220 may be used to control components 225, including initiating operation, braking, acceleration, steering, and/or control of the vehicle 105.

In the context of the present disclosure, a vehicle component 225 is one or more hardware components adapted to perform a mechanical or electro-mechanical function or operation—such as moving the vehicle 105, slowing or stopping the vehicle 105, steering the vehicle 105, etc. Non-limiting examples of components 225 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, etc.

In addition, the computer 210 may be configured for communicating via a vehicle-to-vehicle communication module or interface with devices outside of the vehicle 105, e.g., through a vehicle-to-vehicle (V2V) or vehicle-to-infrastructure (V2X) wireless communications to another vehicle, through MQTT communications between the vehicle 105 and the client devices 135, 180, or to (typically via the network) a remote server. The module 230 could include one or more mechanisms by which the computer 210 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 230 include cellular, Bluetooth®, IEEE 802.11, dedicated short range communications (DSRC), and/or wide area networks (WAN), including the Internet, providing data communication services.

FIGS. 2B through 2G are block diagrams of example devices 120, 125, 130, 165, 175 and 180. Each device includes a respective computer 235-1 through 235-6 and a respective communications module 240-1 through 240-6. Each computer 235-1 through 235-6 includes a processor and a memory. The memory includes one or more forms of computer-readable media, and stores instructions executable by the respective computer 235-1 through 235-6 for performing various operations, including as disclosed herein. Each communications module 240-1 through 240-6 allows the respective computer 235-1 through 235-6 to communicate with other devices within the respective environment 110 and 155. In one or more implementations, the devices 115, 120, 125, 130, 160, 165, 170, and 175 may operate one or more aspects of the blockchain within a trusted execution environment (TEE). For example, the devices 115, 120, 125, 130, 160, 165, 170, and 175 may include suitable hardware, software, firmware, or combinations thereof to execute the functionality described herein.

Figure 3B:
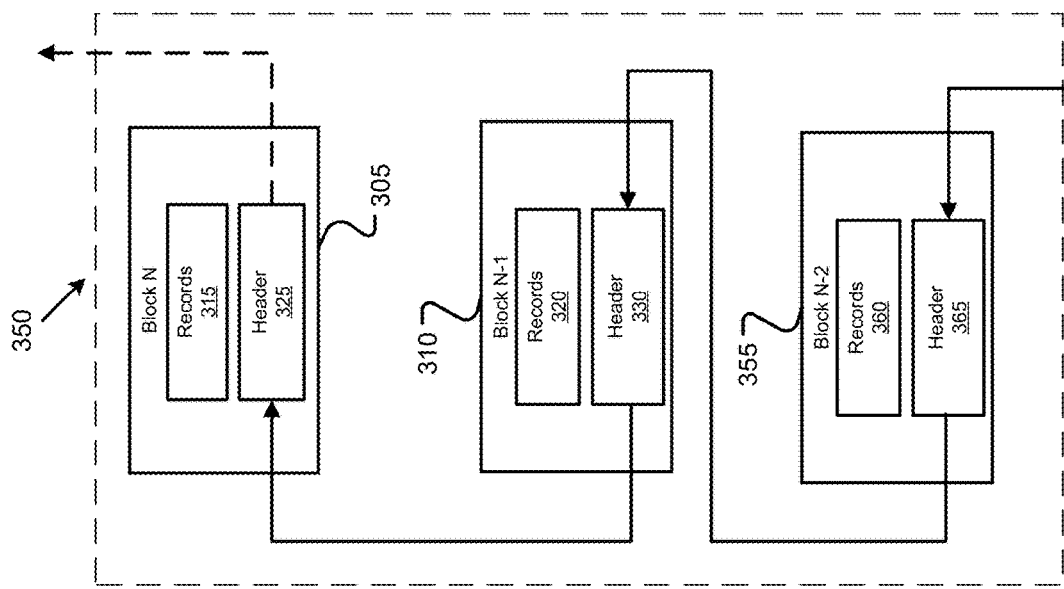
FIGS. 3A and 3B are diagrams of example blockchains including multiple blockchain blocks.
Figure 3A:
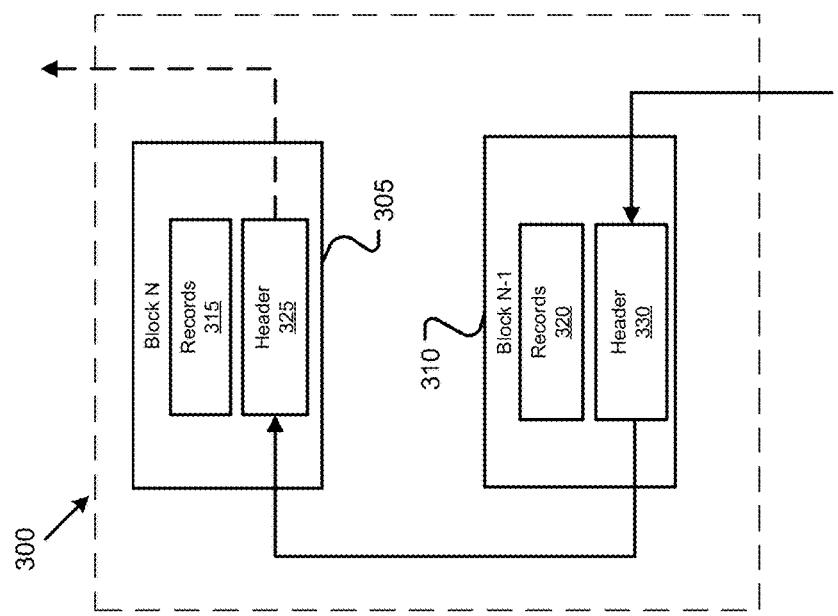

FIG. 3A illustrates example blocks 305, 310 of a blockchain 300 stored by the blockchain nodes, e.g., the mining device 125. It is understood that the blockchain 300 can include additional or fewer blocks. Each block 305, 310 maintains verified records 315, 320. The records 315, 320 represent events, records, and/or transactions that have been executed between two or more participants within the blockchain 300. Each record 315, 320 is verified by a majority of the blockchain nodes. It is understood that the records 315, 320 can correspond to financial transactions and/or to non-financial transactions, e.g., legal agreements, health records, licenses, etc. The blocks 305, 310 also includes a respective header 325, 330 including a hash. The hash is derived from the contents of the records 315, 320 in the respective block 305, 310 and can be used to connect blocks 305, 310.

As discussed above, the intermittently-connected communication environment 110 may only access the Internet intermittently. For example, the devices 115, 120, 125, and 130 may only access the Internet when the base station 135 establishes a connection with the backhaul network device, e.g., the satellite 138, for a certain time period ("connected time period"). When the base station 135 is not connected to the satellite 138, the devices 115, 120, 125, and 130 may only be connected to the local area network ("disconnected time period").

During the disconnected time period, the mining device 125 and blockchain nodes within the intermittently-connected communication environment 110 may continue to service requests for transactions and generate blockchain blocks, such as blocks 305, 310, within the blockchain 300 due to peer-to-peer connections. The generated blocks are added to the blockchain 300 maintained by the blockchain nodes within the environment 110.

The client device 130 can store a copy of the blockchain 300 generated within the environment 110 and may incentivize the vehicle 105 to receive and transport the blocks 305, 310 to a destination device. For example, during the disconnected time period, the vehicle 105 may be incentivized to transport blocks 305, 310 to another environment, such as the wide area communication environment 155. However, it is understood that the vehicle 105 may also transport the blockchain blocks 305, 310 to another environment where another vehicle 105 may receive the copy and transport the copy to the wide area communication environment 155. The blockchain blocks 305, 310 may be transmitted to another vehicle via another client device or the vehicle 105, e.g., via V2V communication network. The vehicle 105 computer 210 may include secure enclave hardware components to store the blocks 305, 310 during transport.

In one or more implementations, the vehicle 105 may be allocated digital assets, e.g., tokens, as an incentive for transporting the copy to another location. By transporting the copy of the blockchain 300, the management device 175 may reconcile, or synchronize, blocks, or portions of, the blockchain 300 relatively quicker as compared to waiting until a wide area network connection is established with the base station 135. FIG. 3B illustrates a blockchain 350 that includes blocks 305, 310, 355. After receiving the blocks 305, 310, the management device 175 synchronizes the blocks 305, 310 with block 355. The blockchain 350 may have been maintained by the blockchain nodes within the environment 155 and only includes block 355 prior to synchronization. Similar to blocks 305 and 310, the block 355 includes a corresponding record 360 and a corresponding header 365. Once the blockchain 350 is synchronized, the management device 175 initiates a transaction to release the digital assets to a digital account, e.g., digital wallet, associated with the vehicle 105.

Figure 4:
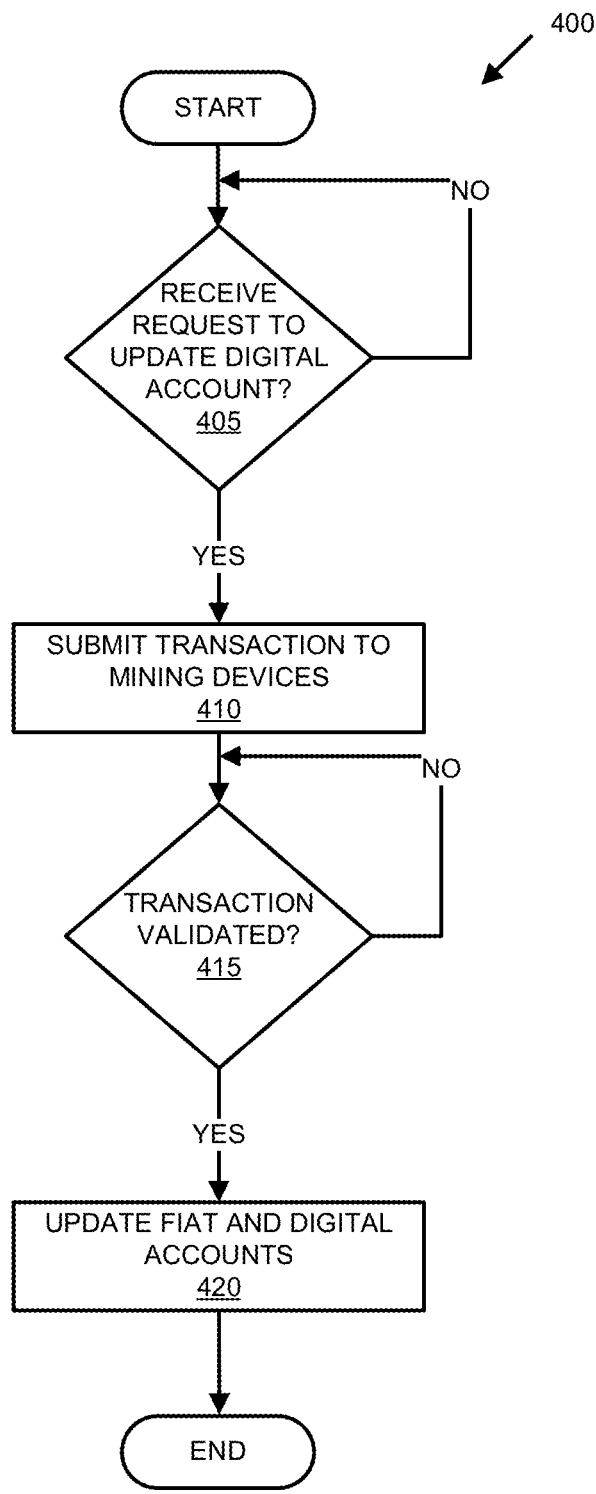
FIG. 4 is a flow diagram illustrating an example process for exchanging currency within a system.

FIG. 4 is a flowchart of an exemplary process 400 for executing a transaction associated with a digital account. Blocks of the process 400 can be executed by the computer 235-5 within the management device 175. The management device 175 is associated with the institution that deployed the blockchain 300. For example, the institution may be a financial institution, a government institution, a healthcare institution, or the like.

The process 400 begins at block 405, in which the computer 235-5 receives a request to update a digital account. For example, the computer 235-5 may receive a request from a user via a initiating device, such as initiating device 120 or 165, to exchange a flat currency (i.e., government-issued and guaranteed) with a digital currency. In another example, the user may submit a request to open a digital account.

At block 410, the computer 235-5 broadcasts the transaction to the connected mining devices, such as mining device 125 and/or mining device 170. For instance, once the computer 235-5 receives a request for a transaction, the computer 235-5 broadcasts the requested transaction to the connected blockchain nodes. As discussed above, during the disconnected time period, the mining device 125 is not connected to the management device 175.

At block 415, the computer 235-5 determines whether the transaction is validated. If the transaction has not been validated, the process 400 returns to block 415. If the transaction has been validated, the computer 235-5 updates the flat account and the digital account associated with the transaction. For example, the mining devices of the blockchain nodes can validate the requested transaction. The validated transaction is combined with other validated transactions to create a new block, such as blocks 305 and 310, by the mining device 125. The computer 235-5 updates the flat and/or the digital accounts based on the validated transaction at block 420.

Figure 5:
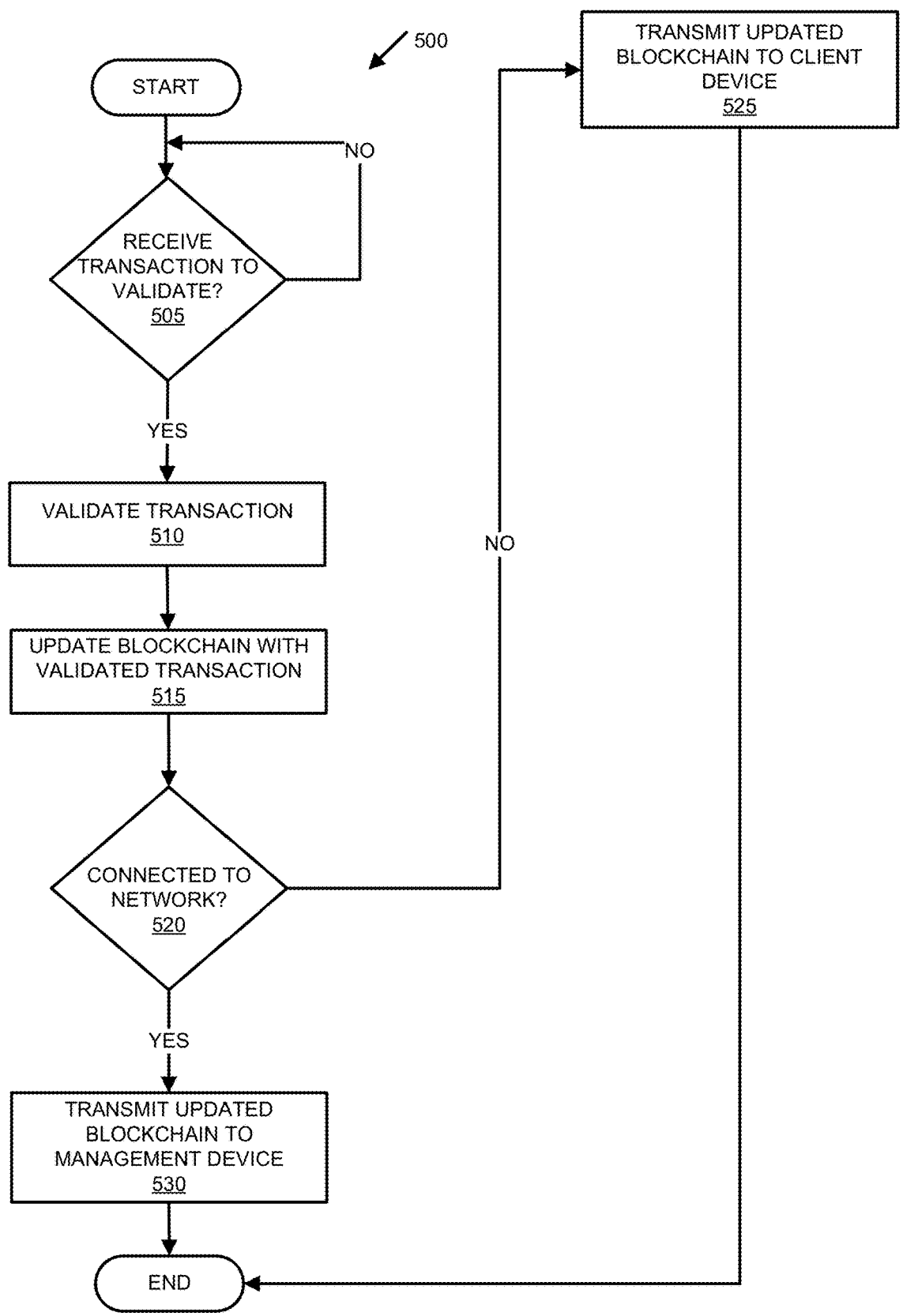
FIG. 5 is a flow diagram illustrating an example process for updating a blockchain within an intermittently-connected communication environment.

FIG. 5 illustrates an example flow diagram of a process 500 for updating the blockchain 300. Blocks of the process 500 can be executed by the computer 235-2 within the mining device 125. The process 500 begins at block 505, in which the computer 235-2 determines whether a transaction to validate has been received. If no transaction has been received, the process 500 returns to block 505. If a transaction to validate has been received, the computer 235-2 validates the transaction at block 510. For example, the computer 235-2 may validate the transaction by confirming that the digital account associated with the user initiating the transaction has sufficient digital assets based on the initiated transaction.

At block 515, the computer 235-2 updates the blockchain 300 with the validated transaction and broadcasts the updated blockchain 300 to other blockchain nodes, such as devices 115, 120, etc. In an implementation, the computer 235-2 generates a block, such as block 305, 310, and inserts the validated transaction and other validated transactions into the block. At block 520, the computer 235-2 determines whether a wireless connection is established with a network device, such as the satellite 138.

If the wireless connection is not established (e.g., disconnected time period), the computer 235-2 causes the updated blockchain 300 to be transmitted to the client device 130 at block 525. As discussed below with reference to FIG. 7, the client device 130 can transmit the updated blockchain 300 to a vehicle 105 such that the vehicle 105 can transport and provide the updated blockchain 300 to a destination client device, e.g., another roadside device. If the wireless connection is established, the computer 235-2 causes the updated blockchain 300 to be transmitted to management device 175 for reconciliation (e.g., synchronization) at block 530.

FIG. 6 illustrates an example flow diagram of a process 600 for receiving and transmitting the updated blockchain 300 to the vehicle 105. Blocks of the process 600 can be executed by the computer 235-3 within the client device 130. The process 600 begins at block 605, in which the computer 235-3 determines whether an updated blockchain 300 has been received. If an updated blockchain 300 has not been received, the process 600 returns to block 605.

If an updated blockchain 300 has been received, the computer 235-3 updates a topic based on the updated blockchain 300 at block 610. In an implementation, the client device 130 uses a MQTT communication protocol to publish updated blockchain data to subscribed vehicles, such as the vehicle 105. In this implementation, the client device 130 may be referred to as a "broker" that distributes the data to subscribed client devices based on topics, and the vehicle 105 can subscribe to one or more topics. In the context of MQTT communication protocols, a topic comprises a string that the broker uses to filter messages for each connected client. Once subscribed, the vehicle 105 receives data transmitted by the client device 130 pertaining to the topic.

The computer 235-3 determines whether an inquiry pertaining to the topic has been received at block 615. For example, once the vehicle 105 is proximate to the client device 130 such that the vehicle 105 can establish a communication link, the vehicle 105 may transmit a data inquiry relating to the topic. If no inquiry is received, the process 600 returns to block 615. If an inquiry is received, the computer 235-3 transmits the updated blockchain 300 and a reward reservation to the vehicle 105 at block 620. In an implementation, the vehicle 105 may only be provided the digital asset as a reward if the vehicle 105 receives the reward reservation from the client device 130 and a delivery confirmation from the client device 180. Once the vehicle 105 receives the updated blockchain 300, the vehicle 105 functions as the broker within the communication environment. The reward reservation comprises a preset token allocation to be provided to a digital account of the vehicle 105 when the updated blockchain 300 is transmitted to the destination device by the vehicle 105.

FIG. 7 illustrates an example flow diagram of a process 700 for receiving the updated blockchain 300 at the vehicle 105. Blocks of the process 700 can be executed by the vehicle 105 computer 210. The process 700 begins at block 705 in which the computer 210 establishes a topic corresponding to the blockchain 300. For example, the computer 210 may be preprogrammed with one or more topics such as one or more intermediate destination devices or a final destination device. At block 710, the computer 210 determines whether the computer 210 is connected to the broker. As described above, the broker may be the client device 130 in some implementations. However, it is understood that any device storing an updated blockchain 300 may be referred to as the broker. If the computer 210 is not connected to the broker, the process 700 returns to block 705. If the computer 210 is connected to the broker, the computer 210 receives the updated blockchain 300 and destination data, if available, at block 710.

FIG. 8 illustrates an example flow diagram of a process 800 for providing the updated blockchain 300 to the client device 180. Blocks of the process 800 can be executed by the vehicle 105 computer 210. The process 800 begins at block 805 in which the computer 210 determines whether a communication link is established with the destination device, such as the client device 180. If communication has not been established with the destination device, the process 800 returns to block 805. If communication has been established with the destination device, the computer 210 transmits the updated blockchain 300 to the destination device at block 810. The computer 210 determines whether the delivery confirmation is received at block 815. For example, once the computer 210 transmits the updated blockchain 300 to the destination device, the destination device transmits the delivery confirmation to the vehicle 105 to indicate the updated blockchain 300 has been received.

The computer 210 transmits the reward reservation and the delivery confirmation to the mining device 170 at block 820. In some implementations, the computer 210 transmits the reward reservation and the confirmation to a device connected to the Internet, which can be routed to one or more blockchain nodes functioning as a mining device, such as mining device 170. The mining device 170 can validate the transactions and include the transactions in a blockchain block.

FIG. 9 illustrates an example flow diagram of a process 900 for synchronizing the blockchain 300. Blocks of the process 900 can be executed by the computer 235-5 of the management device 175. The process 900 begins at block 905 in which the computer 235-5 determines whether the updated blockchain 300 is received, e.g., due to a determination that the backhaul network device is not connected to the base station 135.

If the updated blockchain 300 has not been received, the process 900 returns to block 905. If the updated blockchain 300 has been received, the computer 235-5 synchronizes the blockchain with the updated blockchain 300 and updates the digital account based on the synchronized blockchain at block 910. For example, the computer 235-5 can synchronize the blockchain 300 data created during the disconnected time period with the blockchain maintained at the computer 235-5. The computer 235-5 determines whether the backhaul network device is connected to the base station 135 at block 915. If the backhaul network device is not connected to the base station 135, the process 900 returns to 915. If the backhaul network device is connected to the base station 135, the synchronized blockchain 350 is transmitted to the backhaul network device at block 920 such that the intermittently-connected communication environment 110 is provided the synchronized blockchain 350.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

What is claimed is:

1. A computer, including:
a processor; and
a memory, the memory storing instructions that, when executed by the processor, perform operations comprising:
receiving, from a vehicle computer, a blockchain block generated by one or more blockchain nodes when the one or more blockchain nodes are only connected to a local area network;
synchronizing the blockchain block with a blockchain;
determining that a backhaul network device is not connected to the one or more blockchain nodes and then determining that the backhaul network device is connected to the one or more blockchain nodes; and
responsive to the determining that the backhaul network device is not connected to the one or more blockchain nodes and then determining that the backhaul network device is connected to the one or more blockchain nodes, transmitting the blockchain to the one or more blockchain nodes via the backhaul network device.

2. The computer of claim 1, wherein the memory stores additional instructions that, when executed by the processor, further perform operations comprising:
transmitting a delivery confirmation to the vehicle computer.

3. The computer of claim 1, wherein the memory stores additional instructions that, when executed by the processor, further perform operations comprising:
receiving the delivery confirmation and a reward reservation from the vehicle computer; and
generating, after receiving the delivery confirmation and the reward reservation, a transaction that allocates tokens to a digital account associated with the vehicle computer.

4. The computer of claim 1, wherein the backhaul network device comprises a satellite.

5. The computer of claim 1, wherein a vehicle includes the vehicle computer.

6. The computer of claim 5, wherein the vehicle comprises at least one of a land vehicle or an aerial vehicle.

7. The computer of claim 1, wherein the blockchain block is transmitted by the vehicle computer via a Message Queuing Telemetry Transport (MQTT) communication protocol.

8. The computer of claim 7, wherein the blockchain block is received by the vehicle computer from a roadside device disposed proximate to an intermittently-connected communication environment.

9. The computer of claim 8, wherein a topic is associated with the blockchain block based on the MQTT communication protocol by the roadside device.

10. The computer of claim 9, wherein the blockchain block is transmitted to the vehicle by the roadside device upon receiving a topic inquiry from the vehicle.

11. A method comprising:
receiving, by a processor, from a vehicle computer, a blockchain block generated by one or more blockchain nodes when the one or more blockchain nodes are only connected to a local area network;
synchronizing, by the processor, the blockchain block with a blockchain;
determining, by the processor, that a backhaul network device is not connected to the one or more blockchain nodes and then determining that the backhaul network device is connected to the one or more blockchain nodes; and
responsive to the determining that the backhaul network device is not connected to the one or more blockchain nodes and then determining that the backhaul network device is connected to the one or more blockchain nodes, transmitting, by the processor, the blockchain to the one or more blockchain nodes via the backhaul network device.

12. The method of claim 11, further comprising transmitting, by the processor, a delivery confirmation to the vehicle computer.

13. The method of claim 11, further comprising:
receiving, by the processor, the delivery confirmation and a reward reservation from the vehicle computer; and
generating, by the processor, after receiving the delivery confirmation and the reward reservation, a transaction that allocates tokens to a digital account associated with the vehicle computer.

14. The method of claim 11, wherein the backhaul network device comprises a satellite.

15. The method of claim 11, wherein a vehicle includes the vehicle computer.

16. The method of claim 15, wherein the vehicle comprises at least one of a land vehicle or an aerial vehicle.

17. The method of claim 11, wherein the blockchain block is transmitted by the vehicle computer via a Message Queuing Telemetry Transport (MQTT) communication protocol.

18. The method of claim 17, wherein the blockchain block is received by the vehicle computer from a roadside device disposed proximate to an intermittently-connected communication environment.

19. A system comprising:
a vehicle including a vehicle system, the vehicle system comprising a vehicle computer including:
a first processor; and
a first memory, the first memory including instructions that, when executed by the first processor, perform operations comprising:
receiving, from a client device, a blockchain block generated by one or more blockchain nodes when the one or more blockchain nodes are only connected to a local area network and a reward reservation;
a management device including a computer including:
a second processor; and
a second memory, the second memory including instructions that, when executed by the second processor, perform operations comprising:
receiving, from the vehicle, the blockchain block and the reward reservation;
synchronizing the blockchain block with a blockchain;
updating a digital account associated with the vehicle based on the reward reservation;
determining that a backhaul network device is not connected to the one or more blockchain nodes and then determining that the backhaul network device is connected to the one or more blockchain nodes; and
responsive to the determining that the backhaul network device is not connected to the one or more blockchain nodes and then determining that the backhaul network device is connected to the one or more blockchain nodes, transmitting the blockchain to the one or more blockchain nodes via the backhaul network device.

20. The system of claim 19, wherein the reward reservation comprises a preset token allocation.

* * * * *